(12) United States Patent
Gutierrez

(10) Patent No.: US 6,541,930 B1
(45) Date of Patent: Apr. 1, 2003

(54) METHOD FOR CONTROLLING AN ADJUSTMENT DEVICE THAT IS DRIVEN IN AN ELECTROMOTORICAL MANNER AND USED FOR WINDOW LIFTERS FOR INSTANCE AND A DEVICE FOR CARRYING OUT SAID METHOD

(75) Inventor: Carmelo Gutierrez, Ehringshausen (DE)

(73) Assignee: Küster Automotive Door Systems GmbH, Ehringshausen (DE)

(*) Notice: Subject to any disclaimer, the term of this patent is extended or adjusted under 35 U.S.C. 154(b) by 0 days.

(21) Appl. No.: 09/807,985

(22) PCT Filed: Aug. 31, 2000

(86) PCT No.: PCT/EP00/08557
§ 371 (c)(1), (2), (4) Date: May 2, 2001

(87) PCT Pub. No.: WO01/18935
PCT Pub. Date: Mar. 15, 2001

(30) Foreign Application Priority Data

Sep. 3, 1999 (DE) .......................... 199 42 218
Dec. 14, 1999 (DE) .......................... 199 60 369

(51) Int. Cl.[7] .............................. H02H 7/085
(52) U.S. Cl. ...................... 318/437; 318/266; 318/286; 318/468; 318/608; 388/911
(58) Field of Search .................... 318/244, 245, 318/280, 283, 286, 466–469, 606, 607, 608, 437, 434, 264, 265, 266; 388/911

(56) References Cited

U.S. PATENT DOCUMENTS 4,700,117 A    10/1987  Giebeler et al.
5,162,711 A *  11/1992  Heckler ....................... 318/264
5,497,326 A *   3/1996  Berland et al. ......... 318/468 X
5,952,801 A *   9/1999  Boisvert et al. ............. 318/468
6,051,945 A *   4/2000  Furukawa .................... 318/280
6,121,747 A *   9/2000  Trachtenberg .............. 318/800
6,172,473 B1 *  1/2001  Oka et al. .................... 318/244

FOREIGN PATENT DOCUMENTS

DE    3303590 C2    8/1984
EP     589668 A1    3/1994

* cited by examiner

Primary Examiner—Bentsu Ro
(74) Attorney, Agent, or Firm—Charles P. Boukus, Jr.

(57) ABSTRACT

The invention relates to a method for regulating an electric-motor-driven adjusting device, in particular for vehicles, having a safety circuit (5) for reversing or stopping a drive motor, and to an apparatus for performing this method. To enable fast, safe detection in the event of something becoming caught or pinched, it is provided that an actual value is regulated via a closed-loop control circuit to a set-point value, the actual value or set-point value is a signal having a frequency proportional to the rpm or load on the drive motor, and the phase difference detected with a comparison member of the control circuit is utilized to activate the safety circuit. The apparatus for performing the method is characterized by a control circuit having a set-point value transducer and an actual value transducer, in which as the set-point value or actual value, a signal proportional to the rpm or load of the drive motor is processed, and having a comparison member, such as a phase-locked loop (PLL) circuit (8), for determining the phase difference delivered to a detection stage which activates the safety circuit.

17 Claims, 7 Drawing Sheets

FIG.6
Signal waveforms at the PLL phase detector

METHOD FOR CONTROLLING AN ADJUSTMENT DEVICE THAT IS DRIVEN IN AN ELECTROMOTORICAL MANNER AND USED FOR WINDOW LIFTERS FOR INSTANCE AND A DEVICE FOR CARRYING OUT SAID METHOD

BACKGROUND OF THE INVENTION

The invention relates to a method for regulating an electric-motor-driven adjusting device, for instance for power windows, a sunroof or the like, and in particular for vehicles with a safety circuit for reversing a drive motor, for example, for the power windows or sunroof, and to an apparatus for performing the method.

An electric-motor-driven adjusting device for automobiles of the type defined at the outset is known, for instance from German Patent DE 33 03 590 C2. In it, a safety circuit is provided which reverses the direction of motion of the window if in its upward motion the window meets some resistance, such as a hand or head of a person.

Often, the occurrence of pinching, i.e. of something being caught when closing an opening, is detected by detecting the motor rpm, which drops if a load occurs. The time required to detect a change in rpm, however, is comparatively long, so that in the event of pinching, injuries or at least pain can occur until the window is finally reversed. To shorten the detection time, it is conceivable to use more-powerful processors in the open-loop control system, but these are expensive.

BRIEF SUMMARY OF THE INVENTION

With this as the point of departure, it is the object of the invention to disclose both a method for regulating an electric-motor-driven adjusting device, especially for vehicles, with a safety circuit for reversing a drive motor of the adjusting device, and an apparatus for performing the method, by which safe and fast detection of pinching is made possible. Furthermore, effects caused for instance by poor pavement or the effects of weather (especially in winter) should not be detected as a pinching situation.

In terms of the method, this object is attained essentially in that an actual value is regulated via a control circuit, in particular a closed-loop control circuit, to a set-point value, the actual value and the set-point value are signals proportional to the rpm or load on the drive motor, and a deviation of the actual value from the set point value is detected with a comparison member of the control circuit and is utilized both to adjust the actual value (motor rpm or load) and to activate the safety circuit.

In this method, the properties of a closed-loop control element are advantageously exploited. The response of an actual closed-loop control element is at its fastest simultaneous with the change at the input. The rate of change and the characteristic at the output are also definable. As part of a control circuit, the controller seeks to regulate a generated control difference or deviation to 0. This deviation serves as a basis for an algorithm for assessing any pinching situations that might occur. Other similar but harmless factors, such as accelerations caused by driving on stretches of bad road, sluggishness of the power window or sunroof system, and properties that are changed by the effect of climate are compensated for by the controller, since they differ from the harmful pinching situations in the characteristic and speed of occurrence. This provision serves to enhance closing safety, for instance when driving on bad roads as noted above. The method is used above all to detect dangerous situations when closing a window or sunroof using an electric-motor-driven drive, to prevent injuries from the pinching forces then operative. Despite the sensitivity of the method to dangerous pinching situations, and the short time available for possible detection, a high degree of closing safety is attained. Acceleration factors from outside, of the kind caused by driving on so-called stretches of bad road do not lead to the detection of a pinching situation and thus to the associated erroneous reversal. Nor is the influence of existing and weather-dictated sluggishness of the system assessed as a pinching situation, and thus the window or sunroof or the like can be closed unimpeded. The method is suited to distinguishing these factors from the dangerous pinching situations.

In an advantageous refinement of the invention, an actual frequency is compared with a set-point frequency, and from the phase deviation between the set-point frequency and the actual frequency, a controlling variable or deviation is derived, by which a safety circuit is activatable.

This embodiment makes use of the fact that every change in frequency results in a change of phase, but the change of phase makes substantially faster detection possible than a change of frequency. It can be appreciated that only the edges corresponding to one another of the frequency signals of the set-point frequency and actual frequency have to be compared with one another in order to obtain a deviation, from which a controlling variable can then be derived.

In a further advantageous concept of the invention, the phase deviation or differential signals are integrated over a predetermined period of time and from the integral the controlling variable or deviation is derived, by which the safety circuit is activatable if a certain threshold value is exceeded. For instance if an obstacle appears in the path of displacement of the window, this makes itself felt in a drop in the motor rpm. The result is a phase deviation between the actual frequency and the set-point frequency. From these differential signals, a controlling variable or deviation is determined. If within a predetermined length of time a plurality of such differential signals then occur, the controlling variable or [standard] deviation passes a certain threshold value, and the system detects an obstacle and reverses the drive motor of the power window. The safety circuit can also be activated by means of a microprocessor and a suitably adapted algorithm.

If periodic loads are exerted on the window because of bumpy roads, change in motor rpm, which in turn can be detected in a phase difference between the set-point frequency and the actual frequency. These phase changes are alternating pulses. However, the integration of these differential signals over a predetermined length of time is essentially 0, so that the threshold value is not passed. As a result, effects caused by bumpy roads are precisely not detected as a pinching situation, and activation of the safety circuit does not ensue.

In a further concept of the invention, a set-point frequency is predetermined by an external set-point frequency transducer and compared with an actual frequency determined by the rpm of the drive motor. The mode of operation of the control circuit is based on a readjustment of the motor rpm, which determines the actual frequency, to the predetermined value of the external set-point frequency.

Alternatively, a set-point frequency determined by the rpm of the drive motor is predetermined. A voltage-controlled oscillator readjusted by the controlling variable or deviation forms a fixed-phase actual frequency. The actual frequency is then returned to the phase detector and compared again with the set-point frequency. If the set-point frequency has changed because of an obstacle in the displacement path, then a phase deviation is detected. In the next cycle, the readjusted voltage-controlled oscillator generates an actual frequency that is fixed in phase with regard to this predetermined set-point frequency.

In terms of the apparatus, the object is essentially attained by a control circuit having a set-point value transducer and an actual value transducer, in which as the set-point value or actual value, a signal proportional to the rpm or load of the drive motor is processed, and having a comparison member for forming a deviation, the deviation being delivered to a detection stage which activates the safety circuit.

An advantageous refinement is formed by a control circuit with a set-point frequency transducer, an actual frequency transducer, and a phase detector, which as a comparator forms a phase difference between the set-point frequency and actual frequency, and with a controller which from the phase difference determines a controlling variable for the control circuit, by which controlling variable the actual frequency is readjusted. The safety circuit is activatable by evaluation of the deviation.

In a refinement of the invention, the drive motor of the power window is coupled to an rpm transducer, which is embodied as an actual frequency transducer and as its actual frequency generates a frequency signal that is proportional to the rpm of the drive motor, so that a change in the rpm of the drive motor is immediately detected by the control circuit as a change in actual frequency.

The phase detector is embodied as a digital PLL phase detector, for instance. At its output, this PLL phase detector furnishes the result of the comparison of the set-point frequency and the actual frequency, in the form of a digital voltage, which acts as a deviation. The phase relationship of the actual frequency and set-point frequency to one another is accordingly reflected in the pulse length of the voltage signal output at the output of the PLL phase detector.

The PLL phase detector is advantageously edge-triggered. As a result, it is not necessary for all the frequency signals to be compared, but only one edge, which is entirely adequate for ascertaining the phase relationship of the two frequencies.

In an advantageous feature of the invention, the set-point frequency transducer is embodied as an external frequency generator, which generates the set-point frequency as a reference variable. As a result, a constant reference frequency is available at the phase detector, and with the aid of this frequency, any deviation in the actual frequency of the drive motor can be detected by the phase detector.

A particular feature of the invention provides that the controller is embodied as an analog integral controller. It is thus possible for the voltage pulses that appear at the output of the PLL phase detector as a consequence of the phase displacement of the set-point frequency and actual frequency to be integrated. Preferably, an integration of the differential signals appearing at the phase detector takes place over a certain time interval. In the event that, upon the integration of the voltage signals, a predetermined, optionally variable-time or variable-parameter direct voltage level is passed, the system reacts to an obstacle in the displacement path of the window and reverses the drive motor. The phase differences between the set-point frequency and actual frequency, which occur as a consequence of bumpy roads, have alternating voltage signals, so that the integration over a certain time interval is essentially 0, and thus the direct voltage level is not undershot. Hence bumpy roads are not detected by the control circuit as a pinching situation.

In another advantageous feature of the invention, the control circuit includes an rpm controller for the drive motor, which as a function of the pulses at the output of the PLL phase detector generates an analog controlling variable. The controlling variable is then supplied to a pulse width modulator with a switching transistor, which converts them into a digital voltage by which the actual frequency of the drive motor is readjusted to the set-point frequency of the external set-point frequency transducer if, for example because of weather factors, the friction resistance of the window increases and thus the rpm of the drive motor drops.

In terms of the apparatus, a second way of attaining the object, which is based on the same principle, is that the rpm transducer, coupled to the drive motor of the power window, is embodied as a set-point frequency transducer and as its set-point frequency generates a frequency signal which is proportional to the rpm of the drive motor.

An especially advantageous feature of the invention is that as the actual frequency transducer, a readjusted voltage-controlled oscillator (VCO) is embodied, which generates the actual frequency as a comparison variable to the set-point frequency. By using this kind of readjusted voltage-controlled oscillator, in combination with the drive motor embodied as a set-point frequency transducer, the use of electronics for readjusting the drive motor rpm becomes unnecessary.

In a further feature of the invention, the controller is embodied as an analog proportional-integral controller. The voltage pulses that arrive from the PLL phase detector are now assessed twice by this proportional-integral controller. First, via the integral member of the proportional-integral controller on passing a certain voltage level, the safety circuit is again activated. The proportional-integral controller, analogously to the integral controller of the first version, detects that in the event of bumpy roads, a pinching situation is not involved. Second, via the proportional member of the proportional-integral controller, the operating point of the voltage-controlled oscillator is tracked. From this signal, this oscillator then generates an actual frequency, which is in fixed phase with the original set-point frequency. The actual frequency is then returned to the PLL phase detector, where it is again compared with the set-point frequency. From the phase difference, the PLL phase detector generates a digital voltage signal, which is delivered to the proportional-integral controller.

It is also an essential advantage of the invention that no processor is needed to detect the phase displacement, so that detecting pinching can be done entirely with the existing processor in the vehicle. It is understood, however, that pinching can also be detected by means of a microprocessor.

It is understood that the detection stage for activating the safety circuit can be embodied either in analog fashion or by means of a microcontroller or microcomputer. In the case where a microcomputer is provided, a special algorithm is furnished for detecting the pinching situation. Particularly for detecting a stretch of bad road, the deviation or controlling variable is analyzed accordingly, to avoid so-called erroneous reversals. Erroneous reversals of the drive are understood to mean situations in which a pinching situation is not occurring, but the course of the rpm change of the motor of the adjusting device, for other reasons, at least briefly has a course similar to that in the pinching situation. By analysis of the deviation or controlling variable, either in analog fashion or by means of a microcomputer and a corresponding algorithm, such erroneous reversals of the drive are suppressed. Fluctuations in the on-board electrical system, for instance of the motor vehicle, can under some circumstances also affect the regulation or reversal of the drive motor. This is true particularly for brief major fluctuations in the on-board voltage, since electrical system fluctuations that vary more slowly are readjusted within the control speed of the control circuit and generally do not cause erroneous reversals. Major fluctuations in the system voltage that occur suddenly cannot be detected as such by the actual control circuit, since they can also cause a major change in the motor rpm. Nevertheless, the safety circuit should not reverse if such a case is detected. This can be accomplished for instance by providing that if a major voltage fluctuation in the on-board electrical system is detected, the regulation is briefly deactivated, or the threshold value is adapted to the changed signals. Such suddenly occurring major fluctuations are detected for example via a voltage divider or a capacitor circuit.

Further objects, advantages, characteristics and possible applications of the present invention will become apparent from the ensuing description of two exemplary embodiments in conjunction with the drawings. All the characteristics described and/or shown in the drawing, alone or in arbitrary appropriate combination, form the subject of the present invention, regardless of how they are summed up in the claims and regardless of the claims dependencies.

DETAILED DESCRIPTION OF THE INVENTION

Figure 1:
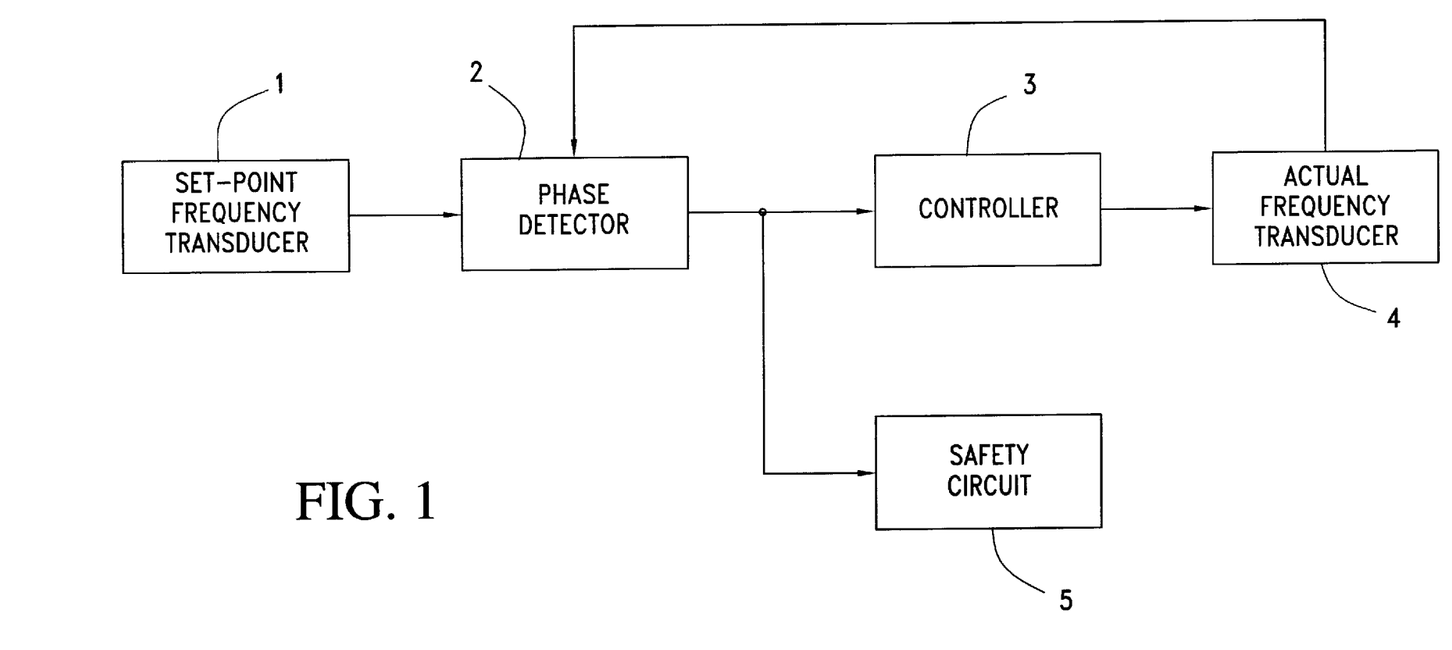
FIG. 1 is a block circuit diagram of the basic layout of the regulating apparatus according to the invention with pinch protection.

In FIG. 1, the block circuit diagram of the basic layout of the regulating apparatus of the invention with pinch protection is shown. It includes the elements that the control circuit must at minimum contain. These are a set-point frequency transducer 1, a phase detector 2, a controller 3, and an actual frequency transducer 4. In addition, a safety circuit 5 is indicated, which is triggered by the control circuit. At the phase detector 2, the set-point frequency of the set-point frequency transducer 1 and the actual frequency of the actual frequency transducer 4 are compared, and their phase deviation is determined. This phase deviation is delivered to the controller 3 as a controlling variable for the actual value transducer and to the safety circuit 5 as a sensed phase deviation which, if greater than a predetermined value, activates the safety circuit 5. It is understood that the predetermined value may be variable as a function of another parameter or time. The safety circuit 5 is activated in each case by the occurrence of pinching-specific signals.

Figure 2:
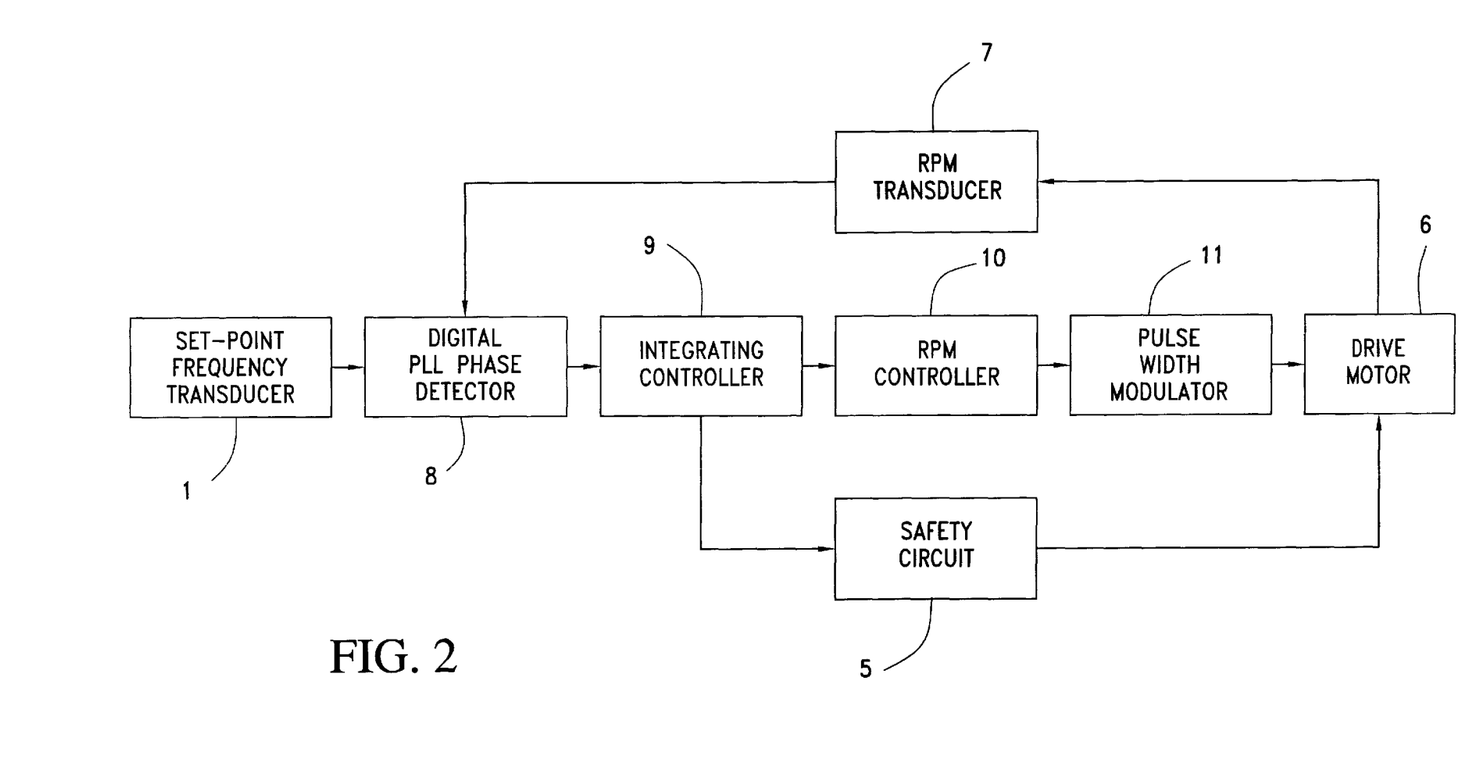
FIG. 2 is a block circuit diagram of the first exemplary embodiment of a regulating apparatus according to the invention with pinch protection.

One exemplary embodiment of the fixed-phase control circuit of the invention for regulating electric motor drives is shown in FIG. 2 and comprises an rpm transducer 7, which is coupled to the drive motor 6 and which as its actual value generates a frequency signal that is proportional to the rpm of the drive motor 6; a set-point frequency transducer 1; a digital PLL phase detector 8 (optionally triggered by the positive edge); an integrating controller 9; optionally, an analog rpm controller 10; and a pulse width modulator 11, optionally with a switching transistor or power stage, for regulating the rpm of the motor 6.

Figure 4:
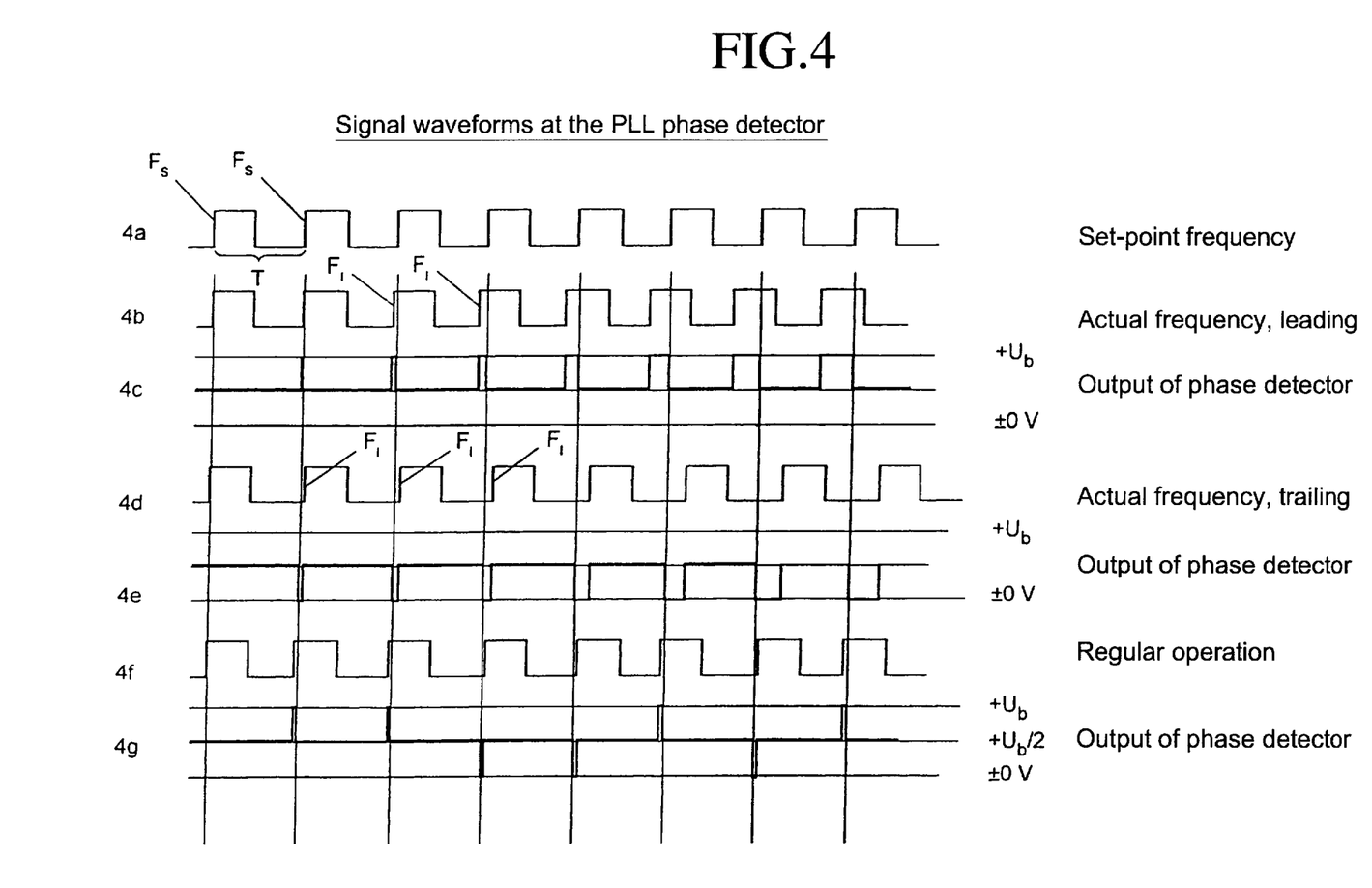
FIGS. 4 and 5 illustrate waveforms of various signals at the PLL phase detector of the first exemplary embodiment of FIG. 2.

In FIG. 4, the set-point frequency is shown by waveform 4a, with phase edges $F_s$ that occur at the chronological interval of the oscillation period T. Waveform 4b represents the actual frequency that is picked up at the motor 6 and delivered to the digital PLL phase detector. In the waveform 4b, the actual frequency is greater than the set-point frequency, and so the phase of the actual value is leading compared to that of the set-point value. In accordance with the chronological spacing of the phase edge $F_s$ of the set-point value compared to the phase edge $F_i$ of the actual value, the phase detector switches its output to $+U_b$, which represents the phase deviation. The signal at the output of the phase detector (with an actual frequency higher than the set-point value) is shown by waveform 4c.

A motor rpm higher than the set-point frequency can be established for instance if the frictional resistance during the summer is reduced considerably compared to the winter months.

The case where the actual frequency is less than the set-point value frequency and accordingly the phases or phase edges $F_i$ of the actual value trail compared to those of the set-point value $F_s$, is shown by waveform 4d. This corresponds to a pinching situation where there is an obstacle in the displacement path of the window. Because of the load exerted on the motor 6, the actual frequency decreases compared to the set-point frequency. The corresponding signal course at the output of the digital PLL phase detector 8 is shown by waveform 4e; the phase detector 8 switches its output to 0 Volts, which corresponds to the phase deviation between the set-point value and the actual value, for that period of time.

In waveform 4f, the signal obtained from the drive motor 6, corresponding to the regular operation, is shown; the set-point frequency and actual frequency are essentially equal. Accordingly, at the output of the phase detector 8 there are voltage signals that alternate periodically about $U_b/2$ (see waveform 4g). This is equivalent to the motor vehicle driving on an uneven road surface.

Figure 5:
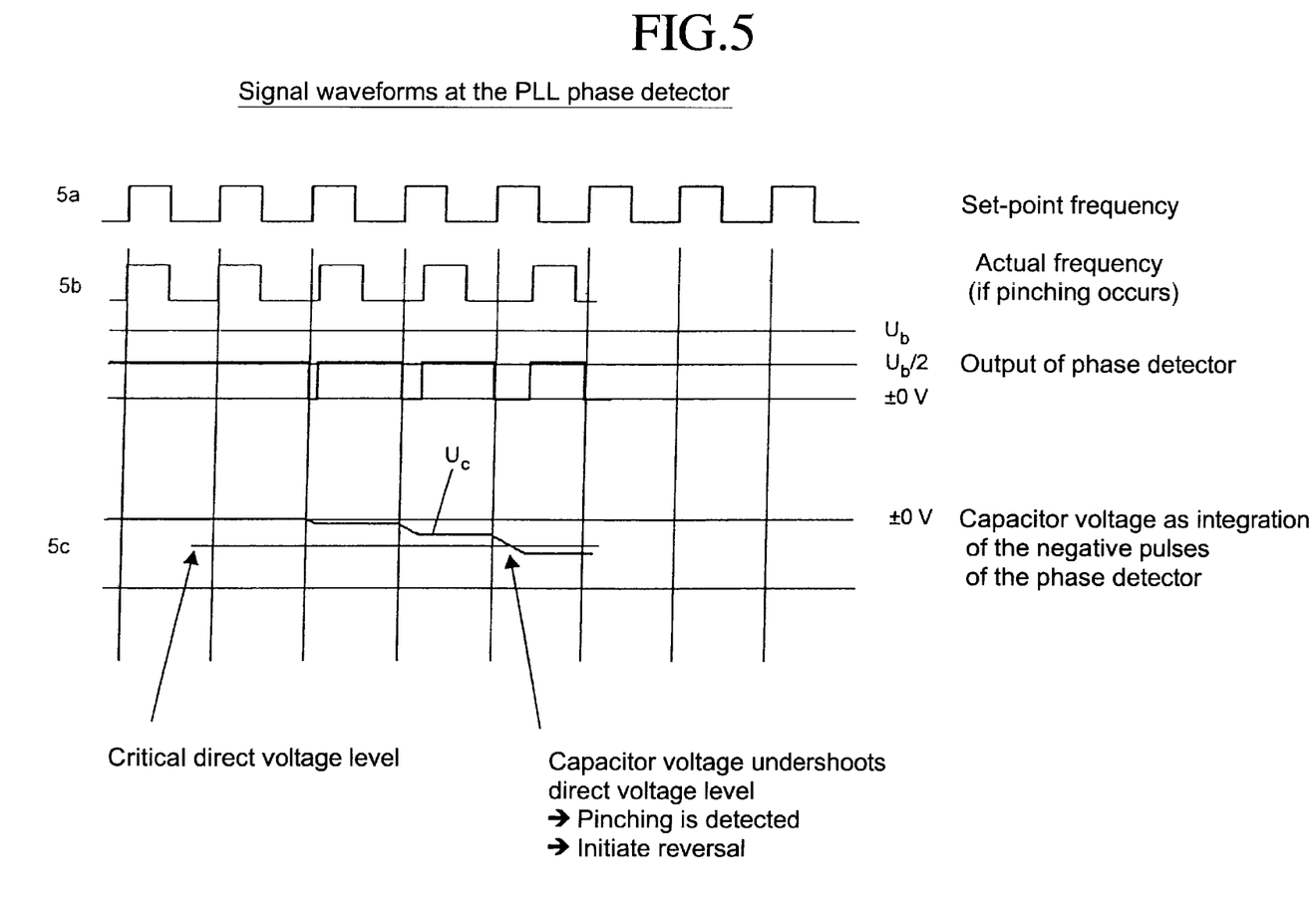

FIG. 5 shows the pinching situation; in waveform 5a the set-point frequency, in waveform 5b the signal of the actual frequency for the pinching situation, that is, with a lesser frequency than the set-point value, and in waveform 5c the voltage $U_c$ at a capacitor, as an integral of the negative pulses of the phase detector 8, are shown.

If the capacitor voltage $U_c$ drops below a predetermined value, labeled as critical direct voltage level, the system detects a pinching situation, and the reversal of the window is thus initiated. The integration of the pulses of the phase detector takes place over a certain time period, which is shorter than the response time for readjusting the actual frequency to the set-point frequency.

As already discussed above, in cases where loads on the power window system occur because of bumpy roads, periodic phase changes with square pulses that alternate about $U_b/2$ occur (see waveform 4g). The capacitor voltage $U_c$ as an integral of these square pulses at the output of the phase detector, however, should not then lead to undershooting of the critical direct voltage level, so that the controller does not conclude that a pinching situation is occurring.

The rpm controller 10 for readjusting the rpm of the motor 6 to the predetermined set-point frequency is used to compensate for changes in the power window system caused by normal wear or changes between the winter and the summer season, as well as to compensate for an uneven load or different frictional forces during a closing stroke.

Figure 3:
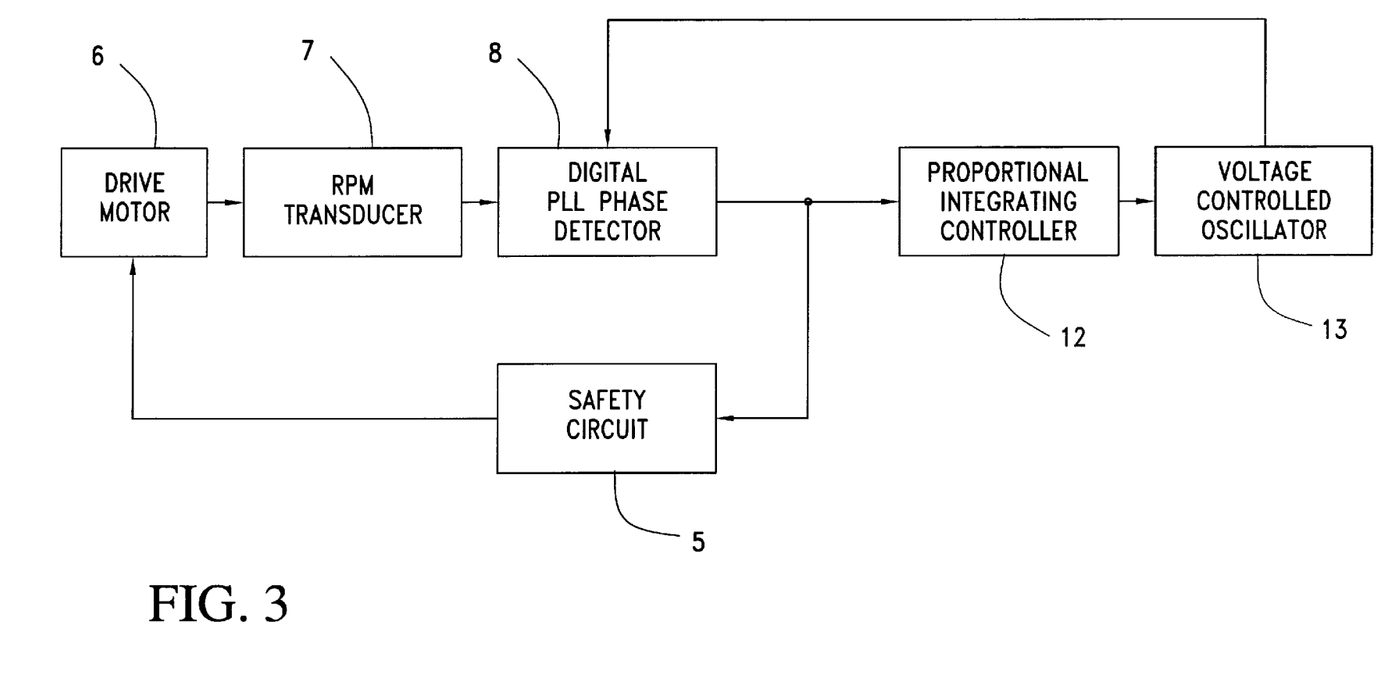
FIG. 3 is a block circuit diagram of the second exemplary embodiment of a regulating apparatus according to the invention with pinch protection.

A second embodiment of the fixed-phase control circuit of the invention for regulating electric motor drives comprises an rpm transducer, which is coupled to the drive motor 6 and which as its set-point value generates a frequency signal which is proportional to the rpm of the drive motor 6. Also provided are a digital PLL phase detector 8, a proportional-integral controller 12, and a readjusted voltage-controlled oscillator (VCO) 13, which generates the actual frequency. A block circuit diagram of this embodiment is shown in FIG. 3.

The actual frequency, which is carried from the output of the voltage-controlled oscillator 13 to the phase detector 8, is ascertained from the set-point frequency of the motor drive 6. Via a proportional-integrating controller 12, for instance, a voltage signal that arrives from the phase detector 8 is modified such that the downstream voltage-controlled oscillator 13 can generate a square signal, which corresponds to and is in fixed phase with the original set-point frequency of the motor drive 6. In terms of control technology, this involves tracking synchronization. From the time lag because of the proportional-integrating controller 12, if the set-point frequency of the motor drive 6 changes there is a phase displacement of the actual frequency of the voltage-controlled oscillator 13, which is then detected at the phase detector 8 and can be stored in memory by means of the proportional-integrating controller 12.

Figure 6:
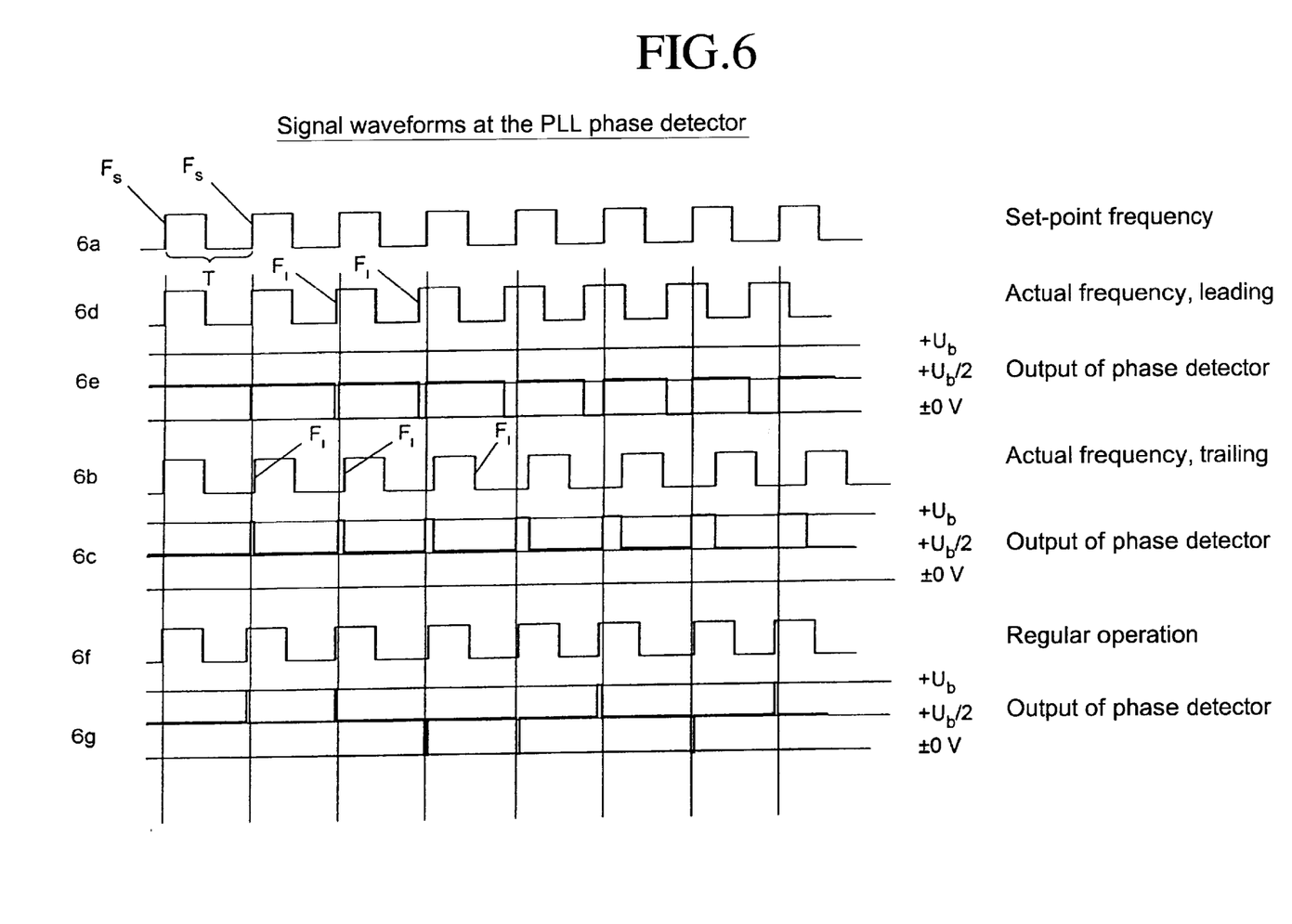
FIGS. 6 and 7 illustrate waveforms of various signals at the PLL phase detector of the second exemplary embodiment of FIG. 3.

In waveform 6a, the set-point frequency picked up from the motor 6 is shown, with phase edges $F_s$ that occur at a chronological interval of the oscillation period T. Waveform 6b shows the signal of the actual frequency picked up at the VCO 13 and delivered to the phase detector 8. In the exemplary embodiment of illustrated by waveform 6b, the set-point frequency is greater than the actual frequency, so that the phase of the actual value trails after that of the set-point value. In accordance with the chronological spacing of the phase edge $F_s$ of the set-point value compared to the phase edge $F_i$ of the actual value, the phase detector switches its output to +$U_b$, which represents a measure of the phase deviation. The signal at the output of the phase detector (with a higher set-point frequency than the actual value) is shown by waveform 6c.

The case where the actual frequency is higher than the set-point frequency and correspondingly the phases or phase edges $F_i$ of the actual value lead ahead of those of the set-point value $F_s$, is shown by waveform 6d. This corresponds to a pinching situation where there is an obstacle in the displacement path of the window. Because of the load acting on the motor 6, the set-point frequency derived from the motor 6 decreases compared to the actual frequency of the VCO 13. The corresponding signal at the output of the phase detector 8 is shown by waveform 6e; the phase detector switches its output for that length of time to 0 Volts, which corresponds to the phase deviation between the set-point value and the actual value.

In waveform 6f, the signal obtained from the drive motor 6 as it occurs during regular operation is shown; the set-point frequency and actual frequency are essentially equal. Accordingly, the result at the output of the phase detector is a waveform with voltage signals that alternate by $U_b/2$. This represents a motor vehicle traveling on a bumpy road.

Figure 7:
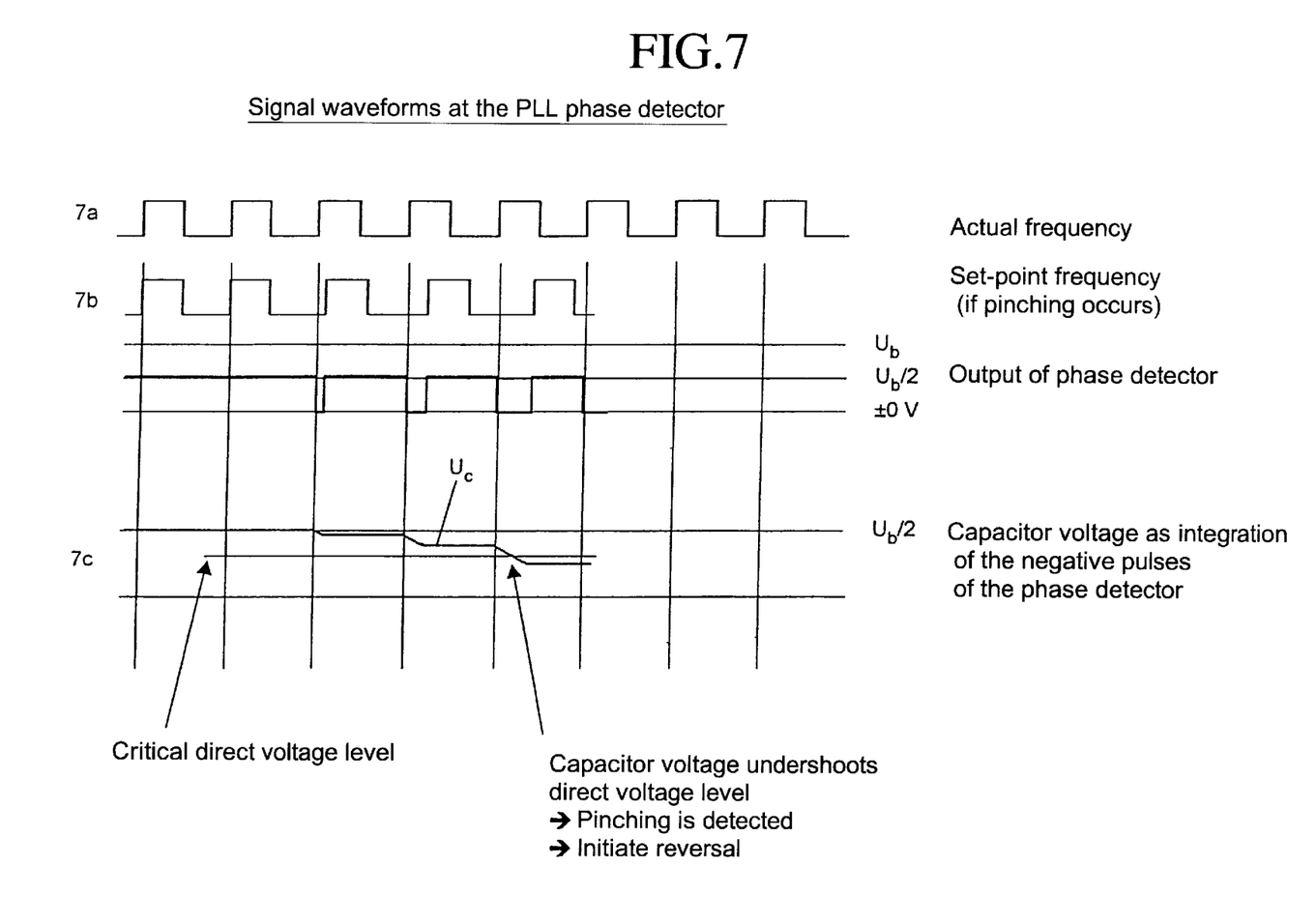

FIG. 7 shows the pinching situation; waveform 7a shows the actual frequency, waveform 7b the signal of the set-point frequency, specifically for the pinching situation, or in other words with a lower frequency than the actual value, and waveform 7c shows the voltage course $U_c$ at a capacitor, as the integral of the voltage pulses, oriented toward "0 Volts", of the phase detector 8.

If the capacitor voltage $U_c$ passes a voltage level, the system detects a pinching situation, and the reversal of the window is thus initiated. The integration of the voltage pulses of the phase detector 8 takes place over a certain time slot, which is shorter than the regulation time of the controller for readjusting the actual frequency to the set-point frequency.

As already indicated above, in cases where loads on the power window system are caused by bumpy roads, phase changes with square pulses occur that alternate about $U_b/2$ (see waveform 6g). The capacitor voltage $U_c$ as an integral of these square pulses at the output of the phase detector 8 then does not, however, lead to passing the direct voltage level, and thus the controller does not conclude that a pinching situation is occurring.

The functional principle of the closing force limitation can be explained in general as follows: Downstream of the drive motor is an actual value transducer, with which the rpm of the drive motor, or the load, is detected. This output signal of the actual value transducer is delivered to a comparison member, which is embodied as a subtractor stage. Appearing at the output of this subtractor stage is for instance the direct voltage signal of the actual value transducer, minus the voltage value at the output of the closed-loop control element. A set-point value transducer can also be provided, whose set-point values are delivered for instance to the closed-loop control element. Overall, the control circuit is embodied such that the deviation at the output of the subtractor stage is regulated to 0. If interfering variables for the actual value occur, the deviation assumes a value other than 0 for variably long periods of time, depending on the characteristic of the closed-loop control element, until the interfering variable has been compensated for by the control circuit and the deviation is again at 0. Accordingly, if a result other than 0 is obtained by the subtraction in the subtractor stage or comparison member, then the closed-loop control element reacts in accordance with its characteristic, with other voltage values at the output, in order to reset the resultant difference to 0. The course and amount of this control difference or deviation reflects the current alternating load of the power window or sunroof drive and can be examined for characteristics that become measurable in dangerous pinching situations or are characteristic for a pinching situation. This evaluation of the deviation is done via a detection stage, which in turn on its output side triggers the safety circuit. A simple exemplary embodiment is monitoring the intensity of load changes of the drive motor over time. This change over time of the load change events is reflected in the amount of the deviation or control difference. If a predetermined threshold value of the deviation is attained or exceeded, then the detection stage can conclude that an undesired or dangerous pinching situation is occurring, and via the safety circuit it can initiate or stop a reversal of the drive motor accordingly. To make the detection insensitive to other events not ascribable to the pinching situation, such as voltage fluctuations of the on-board electrical system, or when traveling over stretches of bad road to make the detection insensitive to effects of acceleration acting on the power window system, it is possible instead of an algorithm to assess the course over time of the control difference or deviation, in order to prevent erroneous reversals or incorrect detections of a pinching situation. The control circuit can also be executed in a program by a processor, but with the example described above the opportunity is also avoided of performing processing by analog means. The realization or combination with a processor offers expanded possibilities in distinguishing a pinching situation from other factors and in easier achievement of so-called comfort functions.

What is claimed is:

1. A method for regulating an electric-motor-driven adjusting device having a safety circuit for reversing or stopping a drive motor, comprising the steps of:

regulating an actual value via a closed-loop control circuit to a set-point value, the actual value and set-point value being signals proportional to actual and set-point of the rpm or load of the drive motor;

said regulating including detecting a deviation of the actual value from the set-point value by a comparison member of the control circuit to change the rpm or load of the drive motor to reduce the deviation; and sensing a value of the detected deviation exceeding a threshold value to activate the safety circuit to reverse or stop the drive motor;

said actual value being a signal having an actual frequency proportional to the rpm of the drive motor and which is compared with a set-point frequency as the set-point value to produce a signal representing the phase difference between the set-point frequency and the actual frequency by which the safety circuit is activated when the phase difference signal exceeds the threshold value.

2. The method of claim 1 wherein the phase difference signal is integrated over a predetermined period of time, and the integral of the integration activates the safety circuit if the threshold value is exceeded.

3. The method of claim 1 wherein the set-point frequency is predetermined by an external set-point frequency transducer and the actual frequency is determined by sensing the rpm of the drive motor.

4. The method of claim 1 wherein the set-point frequency is predetermined by the rpm of the drive motor, and the actual frequency is formed from the set-point frequency by means of a voltage-controlled oscillator.

5. The method as claimed in claim 1 wherein the drive motor closes a window on a motor vehicle, and the safety circuit prevents injury to a hand or body part pinched in the window during closing.

6. An apparatus for regulating an electric-motor-driven adjusting device for vehicles having a safety circuit for reversing or stopping a drive motor, comprising a control circuit having a set-point value transducer and an actual value transducer generating signals representing respective set-point and actual values proportional to the rpm or load of the drive motor to regulate the drive motor;

a comparison member for determining a deviation of the set point value from the actual value; and a detection stage for detecting the determined deviation exceeding a threshold value to activate the safety circuit to reverse or stop the drive motor;

the set-point value transducer being a set-point frequency transducer generating a set-point frequency, the actual value transducer being an actual frequency transducer generating an actual frequency, the comparison member including a phase detector detecting a phase difference of the set-point frequency from the actual frequency, and the control circuit having a controller for determining from the phase difference a controlling variable for adjusting the actual frequency.

7. The apparatus of claim 6 wherein the actual frequency transducer includes an rpm transducer coupled with the drive motor such that the actual frequency is proportional to the rpm of the drive motor.

8. The apparatus of claim 6 wherein the phase detector is embodied as a digital PLL phase detector.

9. The apparatus of claims 8 wherein the PLL phase detector is edge-triggered.

10. The apparatus of claim 6 wherein an external frequency generator is provided as the set-point frequency transducer which generates the set-point frequency.

11. The apparatus of claim 6 wherein the control circuit includes an analog PID controller.

12. The apparatus of claim 6 wherein the control circuit includes an rpm controller for the drive motor.

13. The apparatus of claim 12 wherein the control circuit includes a pulse width modulator with a power stage and which in response to the controlling variable generates a digital voltage by which the actual frequency of the drive motor is readjusted to the set-point frequency of the set-point frequency transducer.

14. The apparatus of claim 6 wherein the set-point frequency transducer includes an rpm transducer coupled with the drive motor to generate the set-point frequency proportional to the rpm of the drive motor.

15. The apparatus of claim 14 wherein the actual frequency transducer includes a readjusted voltage-controlled oscillator which determines the actual frequency from the set-point variable via the controller.

16. The apparatus of claim 14 wherein the controller is embodied as an analog proportional-integrating controller.

17. The apparatus as claimed in claim 6 wherein the electric-motor-driven adjusting device closes a window mounted in a motor vehicle, and the safety circuit prevents injury to a hand or body part pinched in the window during closing.

* * * * *